(12) United States Patent
Graham (10) Patent No.: US 11,933,665 B1
(45) Date of Patent: Mar. 19, 2024

(54) HANDHELD LUMINOMETER AND FRONT END PLATFORM ASSEMBLY

(71) Applicant: CHARM SCIENCES, INC., Lawrence, MA (US)

(72) Inventor: Paul E Graham, Dracut, MA (US)

(73) Assignee: Charm Sciences, Inc., Lawrence, MA (US)

( * ) Notice: Subject to any disclaimer, the term of this patent is extended or adjusted under 35 U.S.C. 154(b) by 0 days.

(21) Appl. No.: 16/296,595

(22) Filed: Mar. 8, 2019

Related U.S. Application Data (60) Provisional application No. 62/640,189, filed on Mar. 8, 2018.

(51) Int. Cl.
*G01J 1/02* (2006.01)
*G01J 1/44* (2006.01)

(52) U.S. Cl.
CPC ........... *G01J 1/0223* (2013.01); *G01J 1/0219* (2013.01); *G01J 1/44* (2013.01); *G01J 2001/0257* (2013.01); *G01J 2001/4453* (2013.01)

(58) Field of Classification Search
CPC .......... G01J 1/0223; G01J 1/44; G01J 1/0219; G01J 2001/4453; G01J 2001/0257; G01J 1/0233; G01J 3/0291; G01N 21/03; G01N 21/59; G01N 21/62; G01N 2201/0221; G01N 21/77; G01N 21/78; G01N 21/255; G01N 21/64; G01N 21/645; G01N 21/25; B01L 9/00
See application file for complete search history.

(56) References Cited

U.S. PATENT DOCUMENTS

| | | | | |
|---|---|---|---|---|
| 2,947,166 | A * | 8/1960 | Palmer | G01M 3/002 73/40.7 |
| 6,699,188 | B2 * | 3/2004 | Wessel | A61B 5/04325 600/300 |
| 9,442,070 | B1 * | 9/2016 | Hug | G01J 3/10 |
| 9,568,413 | B1 * | 2/2017 | Skiffington | G01N 21/59 |
| 2003/0040683 | A1 * | 2/2003 | Rule | A61B 5/14552 600/584 |
| 2003/0209653 | A1 * | 11/2003 | Feldsine | G01N 21/76 250/214 R |
| 2006/0034728 | A1 * | 2/2006 | Kloepfer | A61B 5/14532 435/14 |
| 2007/0031283 | A1 * | 2/2007 | Davis | A61B 5/150221 422/400 |
| 2007/0242105 | A1 * | 10/2007 | Srinivasan | B81B 1/00 347/63 |
| 2010/0255601 | A1 * | 10/2010 | Beaudet | G01N 21/6486 436/164 |

(Continued)

FOREIGN PATENT DOCUMENTS

JP 2015227792 A * 12/2015

*Primary Examiner* — Jennifer D Bennett
(74) *Attorney, Agent, or Firm* — MacCord Mason PLLC (57) ABSTRACT

A handheld luminometer system and assembly are shown and described. In one embodiment, an assembly includes a portable luminometer and a front end platform having a microcontroller circuit to communicate with a host device. Typically, the portable luminometer includes a sample port to accept a test sample holder, a photomultiplier assembly with at least one photomultiplier tube, and a base. The result is a luminometer assembly for use with a single-use test sample holder in communication with a host device.

14 Claims, 7 Drawing Sheets

(56) References Cited

U.S. PATENT DOCUMENTS

| | | | | |
|---|---|---|---|---|
| 2011/0108739 A1* | 5/2011 | Hanko | .................. | G01N 21/80 |
| | | | | 250/459.1 |
| 2011/0313317 A1* | 12/2011 | Callicoat | ................ | A61B 5/155 |
| | | | | 600/581 |
| 2014/0154152 A1* | 6/2014 | Chumanov | ............. | G01J 3/513 |
| | | | | 422/561 |
| 2014/0154792 A1* | 6/2014 | Moynihan | .......... | G01N 21/6486 |
| | | | | 435/287.2 |
| 2016/0299075 A1* | 10/2016 | Willuweit | .......... | G01N 21/6402 |
| 2019/0130805 A1* | 5/2019 | Bae | ........................ | G06T 5/50 |

* cited by examiner

HANDHELD LUMINOMETER AND FRONT END PLATFORM ASSEMBLY

This application claims the benefit of U.S. provisional application No. 62/640,189, filed Mar. 8, 2018, which is incorporated herein by reference in its entirety.

FIELD OF THE TECHNOLOGY

The present disclosure relates generally to analytical testing, and more particularly to improved luminometer systems and assemblies.

BACKGROUND

Determination of cleanliness in industrial, health care and other settings is important for maintaining good hygiene and sanitation. For example, the surfaces of equipment used for food handling, storage or processing are major sources of microbial and allergen contamination. Microbial contamination can lead to decreased shelf life of products and, if pathogens are present, transmission of disease. Similarly, unexpected allergens on food contact surfaces may contaminate food. Such contamination has the potential to cause adverse reactions, such as an allergic reaction including hives, anaphylaxis and death, in sensitive people who consume or otherwise contact the contaminated food.

Microbial culturing can be used to determine the presence of microorganisms. Culturing, however, is time consuming and, therefore, the necessary "real time" feedback to sanitation and food preparation personnel may not be available. As a result, food exposed to surfaces that are later found to contain potentially harmful microorganisms could enter the food supply. Therefore, hygiene and sanitation analysis of a wide variety of materials in industrial, health care and other settings often depend upon the measurement of an intensity of light beam.

Therefore, luminometers, photometers and other instruments for detecting and measuring absorption or emission of light from a test sample can be useful measures of chemical and biological systems and changes, particularly in the determination of emitted light from test samples containing luminescent components. Luminometers, photometers and the like often measure light emission, wherein the test sample, whose light is to be determined, can be maintained at an acceptable optical temperature or other required conditions. Photometer analyzers are typically included for use with multiple bioluminescent or chemiluminescent assay tests. In some applications, a portable analyzer works in conjunction with a varying number of sample holders to determine and measure the presence of ATP, pesticides, phosphatase, and somatic cells; predict shelf life; and also to conduct general microbial quality tests for a wide variety of products.

Traditional devices may include a sample chamber with an entrance port, into which a test vial containing the test sample to be determined is inserted. In particular examples, the test vial containing the sample employed in the test sample holder is a transparent or translucent vial, which permits the passage or emission of the emitted exposed light, for example, in a bioluminescent assay, and, for example, permits light transmission of from about 300 to 650 nanometers, which is visible light range. The test vial with the test sample therein may be separately inserted, or may be removed as a detachable component of a separate test sample holder device, such as an elongated tube, for example, a POCKETSWAB device, (a registered trademark of Chaim Sciences, Inc., of Lawrence, Massachusetts), or other test sample holders described herein.

Applicants desire systems and methods for improved communication and operation of luminomter systems and assemblies, without the drawbacks presented by the traditional systems and methods.

SUMMARY

In accordance with the present disclosure, luminometer assemblies and methods are provided for analytical testing. This disclosure provides an improved assembly that is convenient, efficient, and safe for the user, particularly when utilizing a host device.

In one embodiment, a luminometer assembly includes a photomultiplier tube photon counter having a sample port adapted to accept a single-use test sample holder; a host device; and a microcontroller platform delivering a test result from the photomultiplier tube photon counter to the host device.

In another embodiment, a luminometer assembly for use with a test sample holder includes a portable luminometer with a sample port adapted to accept the test sample holder, into a testing position, and a photomultiplier assembly with at least one photomultiplier tube; a front end platform having a microcontroller circuit adapted to communicate with a host device; and a host device cradle supporting the host device in a semi-fixed operating position.

In certain examples, the cradle includes a linkage support and a receiving aperture adapted to releasably receive a corresponding distal connector.

In another embodiment, a luminometer assembly for use with a test sample holder includes a portable luminometer having a sample port adapted to accept the test sample holder into a testing position, a photomultiplier assembly with at least one photomultiplier tube, and a base aligned at a proximate end; and a front end platform having a microcontroller circuit adapted to communicate with a host device.

In particular examples, the host device is a smart phone, a smart wearable, a tablet, a computer, a combination thereof, and the like. The microcontroller may have an external communication interface. The microcontroller may have a minimal storage and a calibration parameter. The microcontroller may have a data buffer storage.

In certain examples, the portable luminometer includes a housing and a plurality of controls between the housing. The assembly may include a docking station. The docking station may have a neck strap. The docking station may have a support bag.

In particular examples, the assembly includes a host device cradle. The cradle may have a phone clamp having a distal connector. The cradle may have a linkage support. The linkage support may have a receiving aperture adapted to releasably receive a corresponding distal connector.

In certain examples, the portable luminometer includes a chamber positioned between the entrance tube and in an optical path with the photomultiplier tube and having a reflective inner side face. The photomultiplier assembly may have a receptor panel. The portable luminometer may have a deactivator. The portable luminometer may have an insert portion having a reflective inner face and being positioned within a cavity with a first opening aligned with an entrance and a second deactivator opening.

In another embodiment, a luminometer assembly for use with a test sample holder includes a portable luminometer having a sample port adapted to accept the test sample holder into a testing position, and a photomultiplier assembly with at least one photomultiplier tube; and a front end platform having a microcontroller circuit adapted to communicate with a host device.

In some examples, the host device is a smart phone, a smart wearable, a tablet, a computer, a combination thereof, and the like. The host device may include a graphical user interface. The microcontroller may have an external communication interface. The external communication interface may include a Bluetooth low energy adapter module, a USB interface, a combination thereof, and the like.

In particular examples, the microcontroller may have a minimal storage. The microcontroller may have a calibration parameter. The microcontroller may have a data buffer storage. The microcontroller may have a plurality of assay algorithms. The microcontroller may have a communications code.

In some examples, the portable luminometer includes a base aligned at a proximate end. The portable luminometer may include a flat face. The portable luminometer may include an ergonomic face. The ergonomic face may include a ribbed handling face. Further, the portable luminometer may include a housing and a plurality of controls between the housing.

In particular examples, the assembly may include a docking station. The docking station may include a neck strap. The docking station may include a support bag. The docking station may include an electronic charging station.

In some examples, the assembly may include a host device cradle. The cradle may include a phone clamp. The phone clamp may include a distal connector. The cradle may include a linkage support. The linkage support may include a receiving aperture adapted to releasably receive a corresponding distal connector.

In particular examples, the portable luminometer may include a chamber positioned between the entrance tube and in an optical path with the photomultiplier tube and having a reflective, mirrored, or similar inner side face. The entrance port may be light blocking. The photomultiplier assembly may include a receptor panel. The portable luminometer may include a deactivator. The portable luminometer may include an insert portion having a reflective, mirrored inner face and being positioned within a cavity with a first opening aligned with an entrance and a second deactivator opening. The portable luminometer may include upper chamber attachment block.

In some examples, the assembly may include a test sample holder. The test sample holder may be a portable light-blocking holder. The test sample holder may be a single-use holder.

In particular embodiments of the present disclosure is a luminometer for use with a test sample holder to determine emitted light from the test sample holder. The luminometer includes a housing, a photomultiplier assembly, and a chamber having a reflective inner side face. The housing typically includes a sample port and an entrance tube aligned with the sample port and accept the test sample holder into the housing. The photomultiplier assembly typically has at least one photomultiplier tube. The chamber is typically positioned between the entrance tube and in an optical path with the photomultiplier tube.

In some examples, the entrance port is light blocking. The photomultiplier assembly may include a pair of photomultiplier tubes. The photomultiplier assembly may include a receptor panel. The receptor panel may include a photomultiplier receiver. The absorbing window inner side face may include a layer of black paint.

Another embodiment of the present disclosure is a luminometer having a housing with an entrance to accept a test sample, and including an insert portion having a reflective inner face, a photomultiplier portion, and a deactivator. The insert portion is typically positioned within the cavity with a first opening aligned with the entrance and a second deactivator opening. The photomultiplier portion is configured to support at least one photomultiplier tube. Further, the deactivator is typically secured in the second deactivator opening.

In some examples, the chamber includes an upper chamber attachment block. The chamber block may include a tube cavity receiving an entrance tube. The chamber block may include a front assembly lip aligning with the housing. The insert may include a front tube opening. The insert may include a rear deactivator opening. Further, the insert may include a top opening. In addition, the insert portion may include a deactivator cavity to receive the pressed deactivator. The insert portion may include a brace support.

In some examples, the photomultiplier portion includes a receptor cavity that is configured to receive a photomultiplier receptor. Further, the assembly may include a photomultiplier receptor.

Yet another embodiment of the present disclosure is a luminometer having a housing, a photomultiplier assembly, and a chamber with a reflective inner side face. The luminometer generally is for use with a test sample holder to determine the emitted light from the test sample holder. The housing typically includes a sample port and an entrance tube that is generally aligned with the sample port to accept the test sample holder into the housing. The photomultiplier assembly typically includes at least one photomultiplier tube. The chamber is typically positioned between the entrance tube and the photomultiplier tube. Further, the chamber may include first tube opening to receive the entrance tube and a second deactivator opening. In addition, a deactivator may be secured in the second deactivator opening.

In some examples, the device includes an absorbing window inner side face. In particular examples, the absorbing window inner side face includes a layer of black paint.

A further embodiment of the present disclosure is to provide an improved chamber in a luminometer having a housing with an entrance to accept a test sample. The chamber may include an insert portion, a photomultiplier portion and a pressed polytetrafluoroethylene (PTFE) deactivator or a reflective, mirrored, or the like surface. Typically, the insert portion is chosen from a polytetrafluoroethylene (PTFE) pressed insert or a reflective surface, and is generally positioned within the cavity and has a first opening that is generally aligned with the entrance and a second deactivator opening. The photomultiplier portion includes at least one photomultiplier tube. Further, the pressed deactivator is typically secured in the second deactivator opening.

In some examples, the chamber includes an upper chamber attachment block. The chamber block may have a tube cavity that is generally adapted to receive an entrance tube. The chamber block may have at least one fastener hole. Further, the chamber block may have a front assembly lip that is generally adapted to align with the housing.

In other examples, the pressed insert includes a front tube opening. Further, the pressed insert may have a rear deactivator opening. In addition, the pressed may have a top opening. In particular examples, the pressed insert includes outer walls having a thickness of about one millimeter to about ten millimeters. Further, the outer walls may have attachment points.

The insert portion may have a deactivator cavity that is generally adapted to receive the pressed deactivator. Further, the insert portion may have a brace support. The insert portion may have fastener holes. In other examples, the photomultiplier portion may have a rear assembly lip. Further, the rear assembly lip may include fastener holes. In particular examples, the photomultiplier portion may have a receptor cavity that is adapted to receive a photomultiplier receptor. The photomultiplier portion may include a photomultiplier receptor. The photomultiplier portion may include at least one adjustment slit. The photomultiplier portion may include plurality of fastener apertures.

In yet further examples, the pressed deactivator is about one millimeter to about ten millimeters in thickness.

A further embodiment of the disclosure is a luminometer for use with a test sample holder to determine the emitted light from the test sample holder. The luminometer may comprise a housing, a photomultiplier assembly and a chamber. Typically, the housing may have a sample port and an entrance tube that is generally aligned with the sample port and is adapted to accept the test sample holder into the housing. The photomultiplier assembly is typically within the housing and has at least one photomultiplier tube. The chamber is typically positioned between the entrance tube and in an optical path with the photomultiplier tube and has a PTFE pressed insert or a reflective surface.

In some examples, the housing is portable. For instance, the housing may have a battery casing 140. Further, the housing may be handheld. For example, the handheld housing may have opposing grips. The entrance port may be light blocking.

In other examples, the photomultiplier assembly may include a pair of photomultiplier tubes. The photomultiplier assembly may have a receptor panel. The receptor panel may have a photomultiplier receiver. The photomultiplier assembly may further include power circuitry.

In yet further examples, the pressed insert is about one millimeter to about ten millimeters in thickness. The assembly may further include an elongated test sample holder. In other examples, the housing is stationary. For instance, the luminometer may be a bench-top laboratory device.

Still another embodiment of the present disclosure is a luminometer for use with a test sample holder to determine the emitted light from the test sample holder. The luminometer may comprise a housing, a photomultiplier assembly and a chamber. Typically, the housing includes a sample port and an entrance tube that is generally aligned with the sample port and is generally adapted to accept the test sample holder into the housing. The photomultiplier assembly typically has at least one photomultiplier tube. Further, the chamber is typically positioned between the entrance tube and the photomultiplier tube. The chamber may include an insert chosen from a polytetrafluoroethylene (PTFE) pressed insert or a reflective surface, at least one photomultiplier tube and a pressed deactivator. In some examples, the pressed insert may have a thickness of about two millimeters to about four millimeters and is substantially floating within the chamber and having a first tube opening to receive the entrance tube and a second deactivator opening. The photomultiplier assembly may have at least one photomultiplier tube. The pressed deactivator has a thickness of about two millimeters to about four millimeters secured in the second deactivator opening.

The above summary was intended to summarize certain embodiments of the present disclosure. Embodiments will be set forth in more detail in the figures and description of embodiments below. It will be apparent, however, that the description of embodiments is not intended to limit the present inventions, the scope of which should be properly determined by the appended claims.

BRIEF DESCRIPTION OF THE DRAWINGS

Embodiments of the disclosure will be better understood by a reading of the Description of Embodiments along with a review of the drawings, in which:

FIG. 1b is a rear, perspective view of the luminometer assembly according to the embodiment of FIG. 1a;

DESCRIPTION OF EMBODIMENTS

In the following description, like reference characters designate like or corresponding parts throughout the several views. Also in the following description, it is to be understood that such terms as "forward," "rearward," "left," "right" "upwardly," "downwardly," and the like are words of convenience and are not to be construed as limiting terms.

Figure 1A:
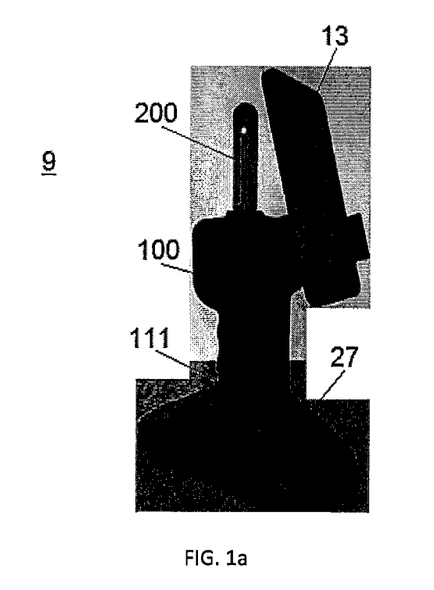
FIG. 1a is a side, perspective view of a luminometer assembly according to an embodiment of the disclosure.
Figure 1B:
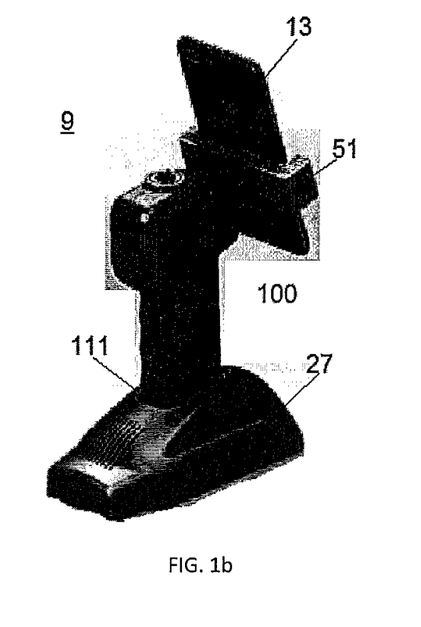

Referring now to the drawings in general and FIGS. 1a and 1b in particular, it will be understood that the illustrations are for the purpose of describing embodiments of the disclosure and are not intended to limit the disclosure or any invention thereto. As best seen in FIG. 1a, a luminometer assembly 9 is shown embodied according to the present disclosure. A luminometer 100 may include a housing and shutter 16 for sealing a test sample in the luminometer 100 for the determination of emitted light from the test sample. As shown, the luminometer 100 may be handheld portable devices, however alternative examples include semi-stationary laboratory bench units. Further embodiments of the luminometer 100 work in conjunction with a variety of sample holders described herein to determine and measure the presence of ATP, pesticides, phosphatase, somatic cells, as well has a wide range of analytical tests for the quality of a wide variety of products.

Figure 2:
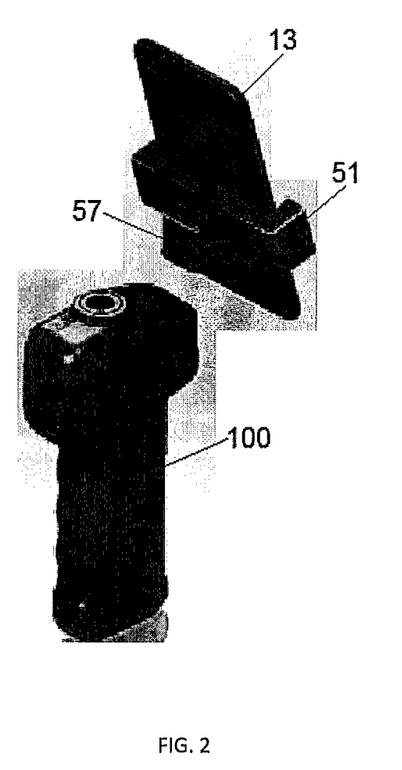
FIG. 2 is a partially-exploded, perspective view of a luminometer assembly according to the embodiment of FIG. 1b.
Figure 3:
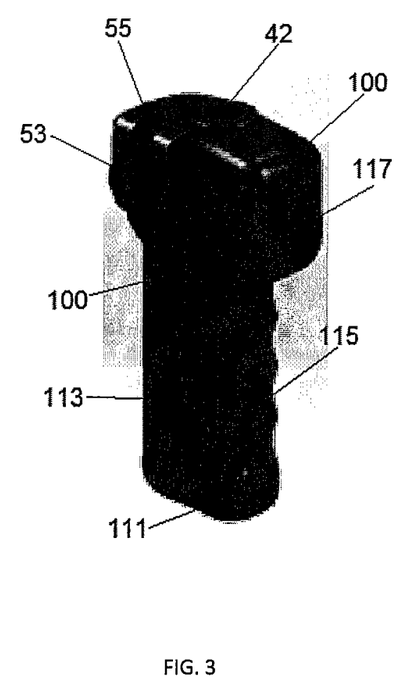
FIG. 3 is a side, perspective view of a luminometer embodiment introduced in FIG. 1a, with elements removed for clarity.

FIGS. 1-3 illustrate particular embodiments of the luminometer assembly 9 wherein photomultiplier tube photon counter 100 has a sample port to receive a test sample holder 200 in a testing position. As further shown, the assembly may include a support connection to removably connect a host device 13 with a luminometer/photomultiplier tube photon counter 100/or the like. As shown, a distal base 111 of the luminometer 100 may be secured in a docking station 27.

In particular embodiments, the luminometer 100 includes an ergonomic face 115, for instance ribbed finger engagement areas, and an opposing flat face 113. Further, the support connection may include a distal connector 57 to be received within receiving aperture 55 of a support 53 affixed, either temporarily or permanently, to the luminometer 100. Those skilled in the art having the benefit of this disclosure will recognize additional support connector orientations and arrangements.

Figure 4:
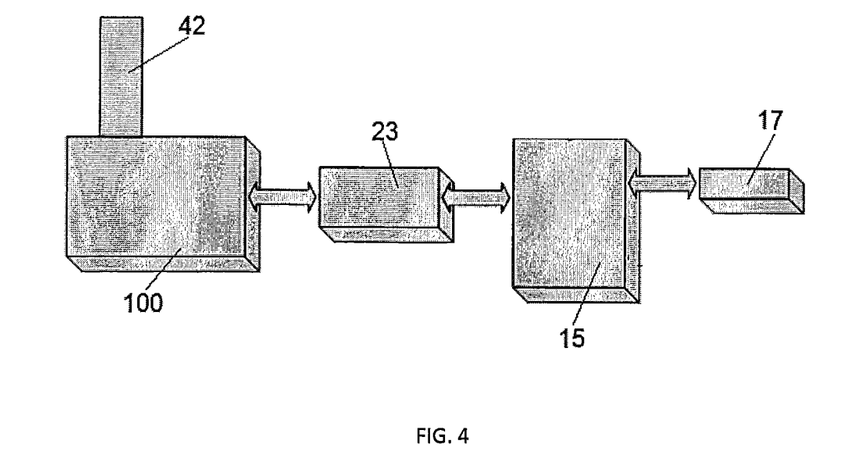
FIG. 4 is a diagram of one embodiment of luminometer, microcontroller, and host device control and communication.

FIG. 4 introduces one embodiment of a communication connection between luminometer 100 and microcontroller 15 to a host device via interface 17.

Figure 5:
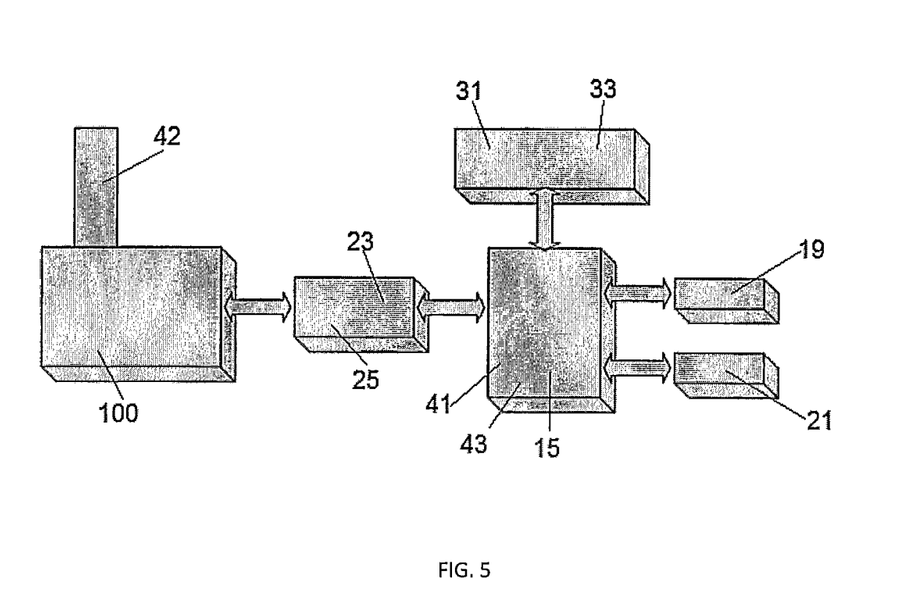
FIG. 5 is a diagram of one embodiment of luminometer, microcontroller, and host device control and communication.

FIG. 5 introduces one example of the communication connection having signal conditioner 23 and power supply 25. Further, the microcontroller 15 may store calibration parameters 31 and buffer data 33. The microcontroller 15 may include firmware with assay-specific algorithms 41 and communications code 43. The interface to the host device may include a USB interface 19, a BLE interface 21, a combination thereof, and the like.

In particular embodiments, the assembly 9 is a Phone App Control via Bluetooth (BLE). The assembly 9 may operate and can be powered from USB as a desktop device. In certain examples, the assembly 9 may portable and may be rechargeable through a charging station. In certain examples, the assembly 9 may include a simple support for instance for one plan uploaded daily. In certain examples, the assembly 9 may include selectable sounds that alert to Pass/Fail test results, including any of the test results shown and described herein.

In certain examples, a basic front end tester platform connects to a Smart Phone, Smart Wearable, Tablet or a PC based platform via USB or BLE (Bluetooth Low Energy). The assembly may include a photomultiplier tube photon counter with associated signal condition circuits coupled to a microcontroller which then couples to minimal, serial storage devices, a USB interface and a BLE adapter module. The BFET platform may provide a minimal microcontroller circuit relying on the connected, smart, host device to act as a GUI and a messenger. The BFET may contain a minimum of storage area which supports individualized calibration parameters and a small buffer area in the event of connection disruption. The firmware/protocol may be robust to transmit of the test data to the smart, host before it deletes the current test data and allows an additional test to be run.

In certain examples, the code is written in C # in the Windows Visual Studio 2015 (or better) environment and with the Xamarin Add-on. Xamarin provides the device specific cross platform compiler and emulator tools for iOS, Android. In certain examples, bluetooth BLE is used to communicate with the Apple iPhone while classic Bluetooth is used on the Android platform. In certain examples, when the connect button is pressed on the main screen, the App will listen for BLE devices that are advertising in the proximity. A list of available devices, with names preceded by "CHRM" will be collected and presented to the user for selection. Subscription to the selected device will then be initiated. In certain examples, after the host system (iPhone) connects with the selected device, the connection must be maintained and the App will first transmit a Request to Communicate command—AP,$,CS. The first field (ML1234) may be an identifier and a serial number. In this case the identifier (ML) indicates a ModuLum instrument. Other identifiers could also be used; EZ for EZ Lite and MLF for Modular Lateral Flow. In certain examples, the assembly 9 may respond with ACK or NAK depending on the checksum equation result. The NAK may induce a re-transmission of the previous data payload. Typically, the device may then begin to transmit status at regular intervals (for instance every two seconds).

In certain examples, basic operational states include:
B=Begin
S=Status
F=Final
In certain examples, values for the status field may include:
1=Idle
2=Test in process
3=Test Complete
4=Idle with unsent test data
5=Error 100 Condition
In certain examples, wait states include:
1=Main Idle (can receive commands from App)
2=Waiting for test complete (Cannot receive commands. Test is imminent)

In certain examples, the assembly may to inform the user by displaying a message or picture on the main screen after the connection has been established. The assembly may also return to this screen when all of the post test processing is complete and wait for a new command.

Figure 6:
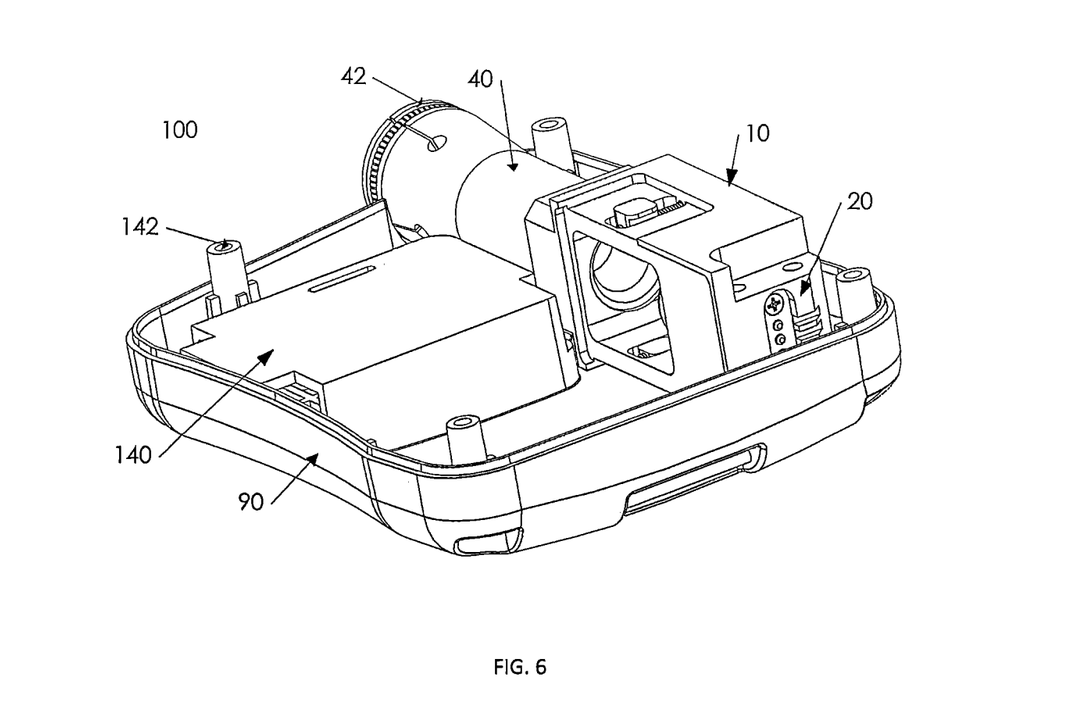
FIG. 6 is an exploded, perspective view of luminometer components, with elements removed to show internal components.

FIG. 6 shows certain elements of the bottom section of one embodiment of a hand-held luminometer 100. Additional embodiments include a variety of designs and arrangements of other hand-held luminometers, as well as non-hand held stationary luminometers. Typically, the hand-held luminometer has an outer case to help protect the internal components secured about attachment points 142. The housing generally has an opening to receive the sample port 42 and entrance tube 40.

In particular embodiments, FIG. 6 shows the chamber 10 aligned between the entrance tube 40 and the photomultiplier assembly 20 in an optical path from the chamber 10 to a photosensitive device of the photomultiplier assembly 20 to receive emitted light from a test sample. Therefore, the mounting of the chamber 10 is generally in relationship to the photomultiplier assembly 20 for the detection of the light transmitted from the sample chamber 10. The end of the chamber 10 opposing the photomultiplier assembly 20 may include a chamber block 32 to generally secure the distal end of the entrance tube 40.

Figure 7:
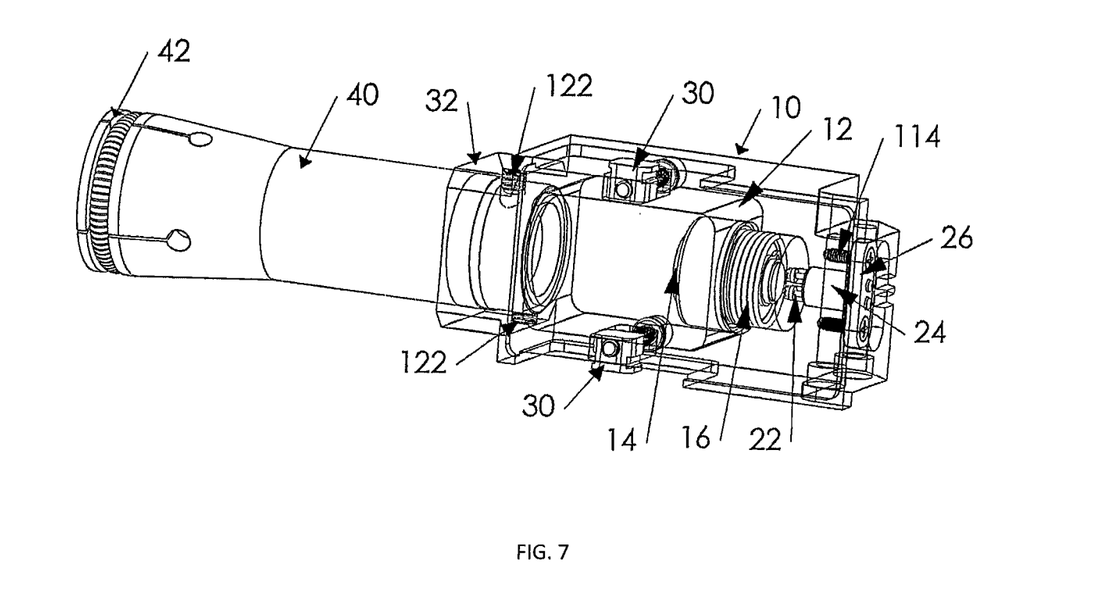
FIG. 7 is a side perspective view of elements introduced in the embodiment of FIG. 6, with elements removed for clarity.

FIG. 7 shows certain internal components of one embodiment of the assembled chamber 10. Typically, the proximate end of the entrance tube 40 includes a sample port 42 to generally receive any of the test sample holder embodiments described or incorporated herein. As shown, the distal end of the entrance tube 40 may be positioned in the chamber block 32 and secured thereto with at least one fastener 122. In this particular example, a pair of opposing fasteners 122 secure the entrance tube and the chamber block 32. Additional embodiments include other positioning and fastening arrangements, including other structural and/or adhesive configurations.

In certain embodiments, the chamber 10 supports an internal insert 12 between the entrance tube 40 and the photomultiplier assembly. As shown in FIG. 7, a pair of opposing braces 30 may support the insert 12 within the chamber 10. For instance, the braces 30 may float the insert 12 within the interior of the chamber 10. The braces 30 may be adjustable to properly align the insert 12 within the chamber 10. The insert 12 typically includes openings on opposing ends as discussed hereinafter. In particular examples, the insert 12 is comprised of highly reflective synthetic material, for instance, a reflective or mirrored surfaces, a pressed polytetrafluoroethylene (PTFE), a smoked magnesium oxide, a pressed magnesium oxide powder, a pressed barium sulfate powder, or similar glasses, tiles, plastics and the like. Other examples of the insert 12 include a variety of other reflective materials and arrangements.

In certain embodiments as shown in FIG. 7, a deactivator 14 is typically positioned in an opposing opening in the insert 12, i.e. opposite the entrance chute opening. The deactivator 14 may protrude through the diverter opening of the insert 12 and extend rearward beyond the insert 12. In particular examples, the deactivator 14 is comprised of a highly reflective synthetic material, for instance a pressed polytetrafluoroethylene (PTFE), a reflective or mirrored surface, a smoked magnesium oxide, a pressed magnesium oxide powder, a pressed barium sulfate powder, or similar glasses, tiles, plastics and the like. Typically, the PTFE is a white solid at room temperature. Other examples of the deactivator 14 include a variety of other reflective materials and arrangements.

In certain embodiments, the chamber 10 may additionally support the photomultiplier assembly. For instance, as shown in FIG. 7, the rear end of the chamber may support a receptor panel 26 secured thereto with fasteners 114. The receptor panel 26 may support a photomultiplier receiver 24 and may have electrical connections to the electrical power circuitry, which generally support at least one photomultiplier tube 22. FIG. 2 shows one particular example with two photomultiplier tubes 22. Other examples include a plurality of photomultiplier tube 22 configurations.

Figure 8:
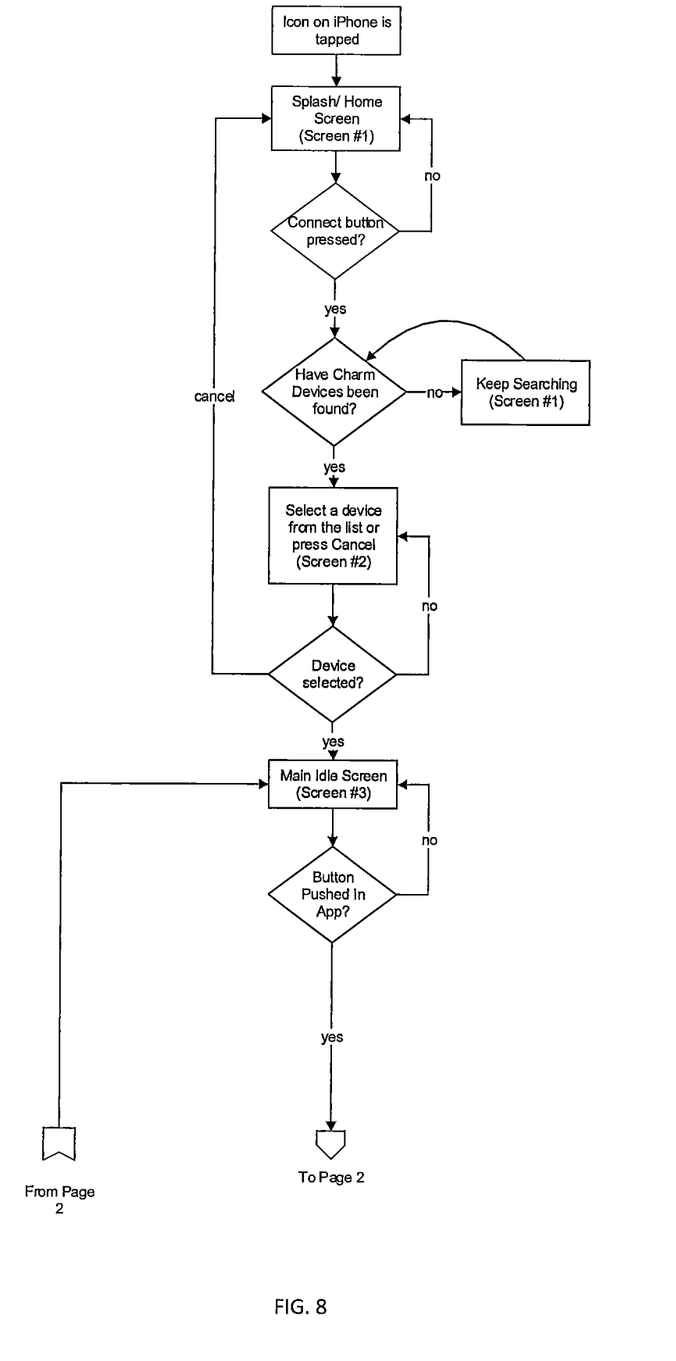
FIG. 8 is a flow diagram of luminometer assembly operation.
Figure 9:
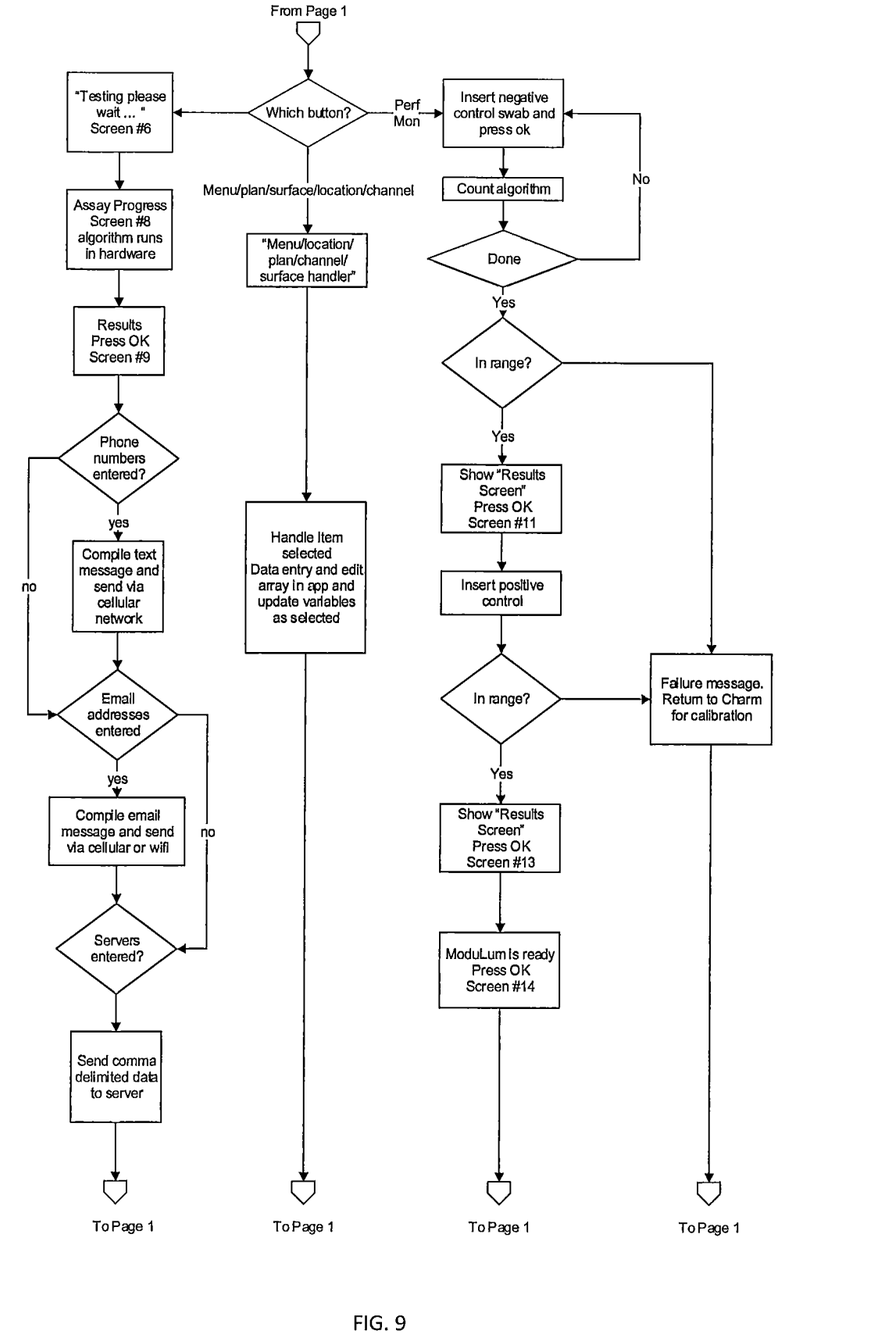
FIG. 9 is a flow diagram of luminometer assembly operation.

FIGS. 8 and 9 illustrate operational schemes and protocols of particular embodiments shown and described herein. Those skilled in the art having the benefit of this disclosure will recognize additional operational commands and processes of the elements and embodiments shown and described herein.

In use in particular embodiments, a light blocking portable test sample holder is inserted into the entrance port 42. The test sample holder may have a tubular body with a light-blocking upper portion and a lower, clear vial section. For instance, the holder may have a light-blocking upper cap, a light blocking intermediate tubular body section, and a lower, clear test sample vial section. The upper cap may have a vertically-extending raised line thereon and internal threads on the lower surface. The intermediate light-blocking tube may have an upper and lower section, divided by a raised horizontal peripheral ridge. The upper section of tube may have threads with an indicator arrow and a vertical, indented, flat marking area thereon. The lower section of tube may be smooth and rounded, with a bottom section of slightly reduced diameter. In yet other particular examples, the translucent test sample vial, with test sample therein, may be detachably secured onto the lower section of the intermediate tube by a threaded top section, which threads into an inner threaded portion on the lower section. Further, the vertical grip ridges may provide for ease in threadably securing the test sample vial, and horizontal ridge on the test vial provides for a stopping means for the threaded section.

In particular examples, luminimoter elements and related luminimoter assembly components useful for the detection of sample analytes are described in U.S. Pat. No. 9,568,413, issued Feb. 14, 2017, which is incorporated herein by reference. Additional luminomoter elements useful for detecting and measuring luminescence in test materials are disclosed, for example, in U.S. Pat. No. 4,213,703, issued Jul. 22, 1980, U.S. Design Pat. No. D393,601, issued Apr. 21, 1998; U.S. Pat. No. 5,917,592, issued Jun. 29, 1999; and U.S. Pat. No. 6,055,050, issued Apr. 25, 2000, all of which are incorporated herein by reference in their entireties. Further, useful portable test sample holder elements and related luminimoter elements useful for the detection of sample analytes are described U.S. Design Pat. No. D388,519, issued Dec. 30, 1997; U.S. Pat. No. 5,827,675, issued Oct. 27, 1998; U.S. Pat. No. 5,965,453, issued Oct. 12, 1999; U.S. Pat. No. 5,985,675, issued Nov. 16, 1999; U.S. Pat. No. 7,229,783, issued Jun. 12, 2007; and U.S. Pat. No. 7,993,871, issued Aug. 9, 2011, all of which are incorporated herein by reference in their entireties.

In other embodiments, the disclosure includes a luminometer assembly kit. In this embodiment, the kit may comprise a luminometer e.g. any of the luminometer elements previously shown or described. Further, the kit may comprise a microcontroller platform e.g. any of the platform elements previously shown or described. In addition, the kit may comprise a support cradle 51, e.g. any of the cradle 51 and support elements previously shown or described.

Numerous characteristics and advantages have been set forth in the foregoing description, together with details of structure and function. Many of the novel features are pointed out in the appended claims. The disclosure, however, is illustrative only, and changes may be made in detail, especially in matters of shape, size, and arrangement of parts, within the principle of the disclosure, to the full extent indicated by the broad general meaning of the terms in which the general claims are expressed. It is further noted that, as used in this application, the singular forms "a," "an," and "the" include plural referents unless expressly and unequivocally limited to one referent.

I claim:

1. A luminometer assembly for use with a single use food product or surface test sample holder, said assembly comprising:
    a. a handheld portable luminometer having
        i. a sample port accepting said single use food product or surface test sample holder into a testing position,
        ii. a photomultiplier assembly with at least one photomultiplier tube, and
        iii. a distal base; and
    b. a device having a microcontroller circuit communicating with a host device thereby acting as a graphical user interface presenting a food product or surface test result from said single use food product or surface test sample holder, and
        wherein said photomultiplier assembly having a photomultiplier tube photon counter with an associated signal conditions circuit coupled to said microcontroller circuit thereby coupling a storage device to relay to said host device.

2. The assembly of claim 1, wherein said host device is chosen from a smart phone, a smart wearable, a tablet, a computer, and a combination thereof.

3. The assembly of claim 1, wherein said microcontroller having an external communication interface.

4. The assembly of claim 1, wherein said microcontroller having a calibration parameter.

5. The assembly of claim 4, wherein said microcontroller having a data buffer storage.

6. The assembly of claim 1, further including a docking station.

7. The assembly of claim 1, further including a host device cradle.

8. The assembly of claim 7, wherein said cradle includes a distal connector adapted to clamp a phone in a substantially fixed position.

9. The assembly of claim 7, wherein said cradle includes a linkage support.

10. The assembly of claim 9, wherein said linkage support includes a receiving aperture adapted to releasably receive a corresponding distal connector.

11. The assembly of claim 1, wherein said portable luminometer includes a chamber positioned between an entrance tube and in an optical path with said photomultiplier tube and having a reflective inner side face.

12. The assembly of claim 1, wherein said photomultiplier assembly includes a receptor panel.

13. The assembly of claim 1, wherein said portable luminometer includes a deactivator.

14. The assembly of claim 1, wherein said portable luminometer includes an insert portion having a reflective inner face and being positioned within a cavity with a first opening aligned with an entrance and a second deactivator opening.

* * * * *